US009903478B2

(12) United States Patent
Langenegger

(10) Patent No.: US 9,903,478 B2
(45) Date of Patent: Feb. 27, 2018

(54) VALVE APPARATUS; ARRANGEMENT WITH VALVE APPARATUS AND METHOD FOR OPERATING AN ARRANGEMENT

(71) Applicant: GEA ASEPTOMAG AG, Kirchberg (CH)

(72) Inventor: Urs Langenegger, Worb (CH)

(73) Assignee: GEA ASEPTOMAG AG, Kirchberg (CH)

( * ) Notice: Subject to any disclaimer, the term of this patent is extended or adjusted under 35 U.S.C. 154(b) by 237 days.

(21) Appl. No.: 14/426,619

(22) PCT Filed: Aug. 27, 2013

(86) PCT No.: PCT/EP2013/002575
§ 371 (c)(1),
(2) Date: Mar. 6, 2015

(87) PCT Pub. No.: WO2014/040700
PCT Pub. Date: Mar. 20, 2014

(65) Prior Publication Data
US 2016/0258539 A1    Sep. 8, 2016

(51) Int. Cl.
*F16K 1/44*    (2006.01)
(52) U.S. Cl.
CPC .................. *F16K 1/446* (2013.01)
(58) Field of Classification Search
CPC ....................................................... F16K 1/446
(Continued)

(56) References Cited

U.S. PATENT DOCUMENTS 660,995 A * 10/1900 Murray ................. D06F 39/081
137/312
1,235,409 A * 7/1917 Aldrich ................... F16K 1/446
137/240
(Continued)

FOREIGN PATENT DOCUMENTS

CN    101342963    1/2009
DE    20317882    12/2004
(Continued)

OTHER PUBLICATIONS

English translation of Office Action from State Intellectual Property Office of the People's Republic of China dated Mar. 24, 2016.
International Search Report for PCT/EP2013/002575.
English translation of Office Action from Japanese Patent Office dated Dec. 13, 2016, JP 2015-530311 (Dec. 5, 2016).

*Primary Examiner* — Jessica Cahill
*Assistant Examiner* — Daphne M Barry
(74) *Attorney, Agent, or Firm* — Merek Blackmon & Voorhees, LLC

(57) ABSTRACT

The invention relates to a valve apparatus having a housing (100), which housing has a first port (102), which can be connected to a tank (200), and a second port (106), having a closing element (110) which is provided in the housing and which can be placed into an open position, in which a fluid connection is produced between the first port and second port, and which can be placed into a closed position, in which the first and second ports are separated from one another in fluid-tight fashion, having a first (120) and a second (130) seal arrangement between closing element and housing, wherein the first and the second seal arrangement (120, 130) are spaced apart from one another and wherein each seal arrangement interacts with a corresponding seat (126, 136). To create a valve device for the aseptic transport of filling material, it is proposed that a chamber (140) be provided which, in the closed position, is delimited by the seal arrangements, the closing element and the housing, and that a reservoir (142) is provided which can be connected to the chamber and which serves to accommodate a bacteri- (Continued)

cidal fluid, and that the chamber (140) and the reservoir (142) are adapted to form a germ barrier that is created in the closed position with the bactericidal fluid. The invention also relates to an arrangement having a valve apparatus of said type and to a method for operating an arrangement.

13 Claims, 2 Drawing Sheets

(58) Field of Classification Search
USPC .......................................................... 137/246
See application file for complete search history.

(56) References Cited

U.S. PATENT DOCUMENTS

| | | | |
|---|---|---|---|
| 4,019,962 A | * | 4/1977 | Allen .................. B01F 3/04531 |
| | | | 435/247 |
| 7,448,418 B1 | | 11/2008 | Tuyls |
| 2010/0072411 A1 | | 3/2010 | Norton |
| 2010/0154245 A1 | | 6/2010 | Py |

FOREIGN PATENT DOCUMENTS

| | | |
|---|---|---|
| DE | 202011004300 | 10/2011 |
| EP | 0928915 | 7/1999 |
| JP | 2009127761 | 6/2009 |
| WO | 0171228 | 9/2001 |

* cited by examiner

US 9,903,478 B2

VALVE APPARATUS; ARRANGEMENT WITH VALVE APPARATUS AND METHOD FOR OPERATING AN ARRANGEMENT

CROSS-REFERENCE TO RELATED APPLICATION

The present application claims priority under 35 U.S.C. 119 of Swiss Application No. 01650/12, filed Sep. 11, 2012, which is hereby incorporated herein by reference in its entirety.

The invention relates to a valve apparatus according to the preamble of claim 1, an arrangement comprising a valve apparatus according to claim 1 and a method for operating such an arrangement comprising a valve apparatus according to claim 1.

PRIOR ART

For many foods, the country of origin of the raw produce and the markets on which they are sold are separated from each other by large distances. For example, various kinds of fruit are harvested in South America and processed to form a basic liquid foodstuff which must be transported as far as Europe. Transportation is in tank containers, for example. Such a tank container has a frame construction in which a tank is secured. The tank container may then be transported overseas on container ships, transloaded at the destination port onto earthbound means of transport, then transported by rail and road. The frame construction is necessary for loading and unloading operations. A valve apparatus is provided on the tank, with which valve apparatus the basic foodstuff can be fed into the tank and removed again at the destination.

Some basic liquid foodstuffs pose a major challenge for transportation. For example, the basic material for fresh and largely untreated orange juice becomes unfit for consumption even at minimal levels of germ contamination. Due to contamination with germs, the environmental conditions during ocean transport and the duration between loading and unloading have hitherto prevented any cost-efficient transportation of such orange juice.

Some weak points of tank containers have been identified as problematic points and include the "manhole", or facilities for taking samples.

Another weak point for transportation is the valve apparatus for the tank. The valve apparatus comprises a closing element having a seal arrangement, the seal arrangement coming into contact with a seat, in the closed position, thus interrupting the fluid connection between the ports of the valve apparatus. In the region of the seal arrangement, there is a risk of contamination by germs, particularly in the case of very long transportation routes such as the aforementioned, and the procedures this involves.

One consequence is that some basic foodstuffs have never been transported over such long distances hitherto by means of such tank containers, as contamination with germs could not be prevented, despite meticulous operation and treatment with sterilising fluids, for example with hot steam.

The object of the invention is therefore to provide a valve apparatus, an arrangement comprising such a valve apparatus, and a method of operation that allow transportation under aseptic conditions.

SUMMARY OF THE INVENTION

This object is achieved by a valve apparatus having the features of claim 1, an arrangement comprising a valve apparatus and having the features of claim 10, and a method for operating a valve apparatus and having the features of claim 14. The other claims specify advantageous developments of the valve apparatus, the arrangement and the method.

The valve apparatus according to claim 1 includes a closing element, two seal arrangements and a reservoir. When the valve apparatus is in a closed position, the closing element and the seal arrangements, together with the housing or a component belonging to the housing and disposed in the housing enclose a chamber which can be connected to a reservoir. The reservoir is designed to accommodate a bactericidal fluid. The chamber and the reservoir are adapted to form a germ barrier located in the chamber. Such adaptation includes, for example, the choice of content in the chamber and reservoir spaces. These measures allow bactericidal fluid to be introduced into the chamber, and a germ barrier to be formed in that manner. The reservoir and chamber allow this germ barrier to be produced free of air bubbles and to be formed and maintained for the entire duration of transportation. Contamination of the transported filling material with germs is thus prevented.

Advantageous developments of the invention, described in the following, are specified in the dependent claims.

A cost-efficient embodiment of the seal arrangements includes a receptacle associated with each closing element and which is inserted into a sealing ring, for example an elastomer.

According to the development of the invention in claim 3, the first seal arrangement may be assigned to the first port and be embodied as a radial seal. The allows the closing element to be moved into a partial stroke position, and in particular allows the second seal arrangement to be separated from its seat. The surfaces which delimit the chamber are cleaned as a result, while the tank remains separated from its surroundings by the first seal arrangement. According to the development of the invention in claim 4, an adjustment device is provided and configured to move the closing element not only between an open position and a closed position, but also into a partial stroke position in which the first seal arrangement remains in sealing contact with the seat, while the second seal arrangement does not come into contact with the seat assigned to it. The aforementioned advantages of the partial stroke position can thus be exploited with a cost-efficient construction. More particularly, the adjustment device according to claim 5 may include a main adjustment device and a secondary adjustment device, the secondary adjustment device moving the closing element into the partial stroke position. This construction of the adjustment device is simple and cost-efficient, as the functions are separated and simple actuation is thus sufficient. For example, there is no need for complicated position measuring. Designing the main and secondary adjustment device so that they can be impinged upon by a pressure medium, in accordance with claim 6, is likewise cost-efficient and simple.

According to the development of the invention in claim 7, the second seal arrangement has an axial or semi-axial configuration. In this way, it forms a mechanical path limiter, in particular a stop member which defines the closed position of the closing element. This allows the pressurised closed position to be defined by technically simple means.

According to claim 8, a bellows is provided which surrounds a valve rod provided between the adjustment device and the closing element. This prevents germs from entering via the valve rod. The bellows may have a constant diameter throughout. It may also have a diameter designed such that an end face having a pressure equalisation function results. This prevents "pressure shocks", which ensue when the valve apparatus is inevitably operated with the filling material flowing in different directions when filling and emptying the tank.

In the development of the invention in accordance with claim 9, a fluid valve is disposed between the reservoir and the chamber. This makes it easier to meter the dosage of bactericidal fluid. For example, the reservoir may be filled independently of the chamber.

The advantages of the valve apparatus are manifested, in particular, in an arrangement according to claim 10, in which the ability to form a germ barrier has very advantageous effects on the storability of filling material in a tank of the arrangement.

Dependent claims 11 to 13 relate to further developments of the arrangement with the aforementioned valve apparatus.

According to claim 11, a tank opening and the first port are connected to each other by means of an aseptic bolt flange connection. This facilitates maintenance and replacement of the valve apparatus while simultaneously preventing germs from entering there.

According to claim 12, the tank is disposed in a tank container, thus simplifying its transportation by making it stackable, and simplifying how it is loaded and unloaded. The advantages of the germ barrier that can be formed in the valve apparatus are brought especially to the fore in this manner.

The chamber can be filled with bactericidal fluid in a particularly reliable manner when the reservoir according to claim 13 opens into the chamber at the highest point thereof in relation to the direction of gravity.

The method involves the aforementioned chamber being filled with bactericidal fluid after a tank provided in an arrangement with the valve apparatus is filled with the filling material to be transported. The germ barrier is produced as a result, which then allows subsequent transportation over large distances and durations, without the filling material becoming contaminated with germs.

The development of the method according to claim 15 improves the quality of the germ barrier by having the step of filling the chamber with bactericidal fluid include the closing element being placed into the partial stroke position in such a way that air bubbles can escape from the fluid.

The development of the method in accordance with claim 16 improves the removal process. After transportation, the germ barrier is removed by placing the closing element in the partial stroke position and performing a sterilisation process. This prevents the fluid from mixing with the filling material transported in the tank and simultaneously prevents the entry of germs during the removal process.

BRIEF DESCRIPTION OF THE DRAWINGS

The invention shall now be described in greater detail with reference to an embodiment and to further developments of the invention, in which:

FIG. 2a) the closing element in the closed position,
FIG. 2b) the closing element in the partial stroke position,
FIG. 2c) the closing element in the open position.

DETAILED DESCRIPTION

Figure 1:
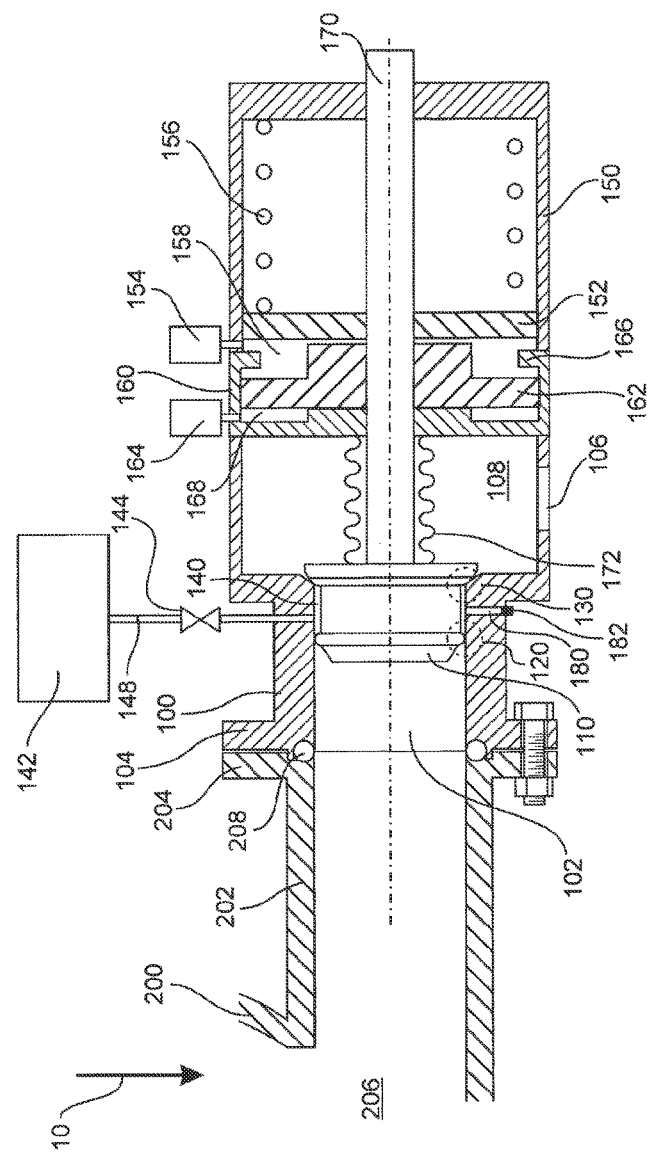
FIG. 1: shows a cross-section through part of an arrangement comprising a tank and a valve apparatus.

A cross-section through a valve apparatus within an arrangement that includes a tank is shown in FIG. 1.

A tank 200, which may be provided within a frame construction for forming a tank container, includes a feed pipe 202 with a tank-side flange 204. An interior 206 of tank 200 can be filled through said feed pipe.

A valve apparatus is connected to the tank-side flange 204 of feed pipe 202. The Figure shows a bolt flange connection, in which a valve flange 104 and the tank-side flange 204 are embodied in such a way that an aseptic bolt flange connection is produced. This is characterised, in particular, by a minimisation of deadzones and by corners and edges in the region of a flange seal 208. Flange seal 208 in flanges 104 and 204 is enclosed in large part by arcuate recesses. In order to exploit the advantages of standardisation, the flange connection may be configured in accordance with DIN 11864.

Valve flange 104 is disposed on a housing 100 of the valve apparatus and surrounds a first port 102 which can be connected to tank 200 as shown in FIG. 1.

As an alternative to the aseptic bolt flange connection, a welded connection may be provided between tank 200 and housing 100 of the valve apparatus. Such a connection offers the additional advantage that contamination with germs is almost totally excluded and that the connection can be cleaned completely. Such a connection also has no need of maintenance.

In housing 100 of the valve apparatus, there is a second port 106, and a closing element 110 which can be placed into an open position in which a fluid connection is produced between the first port 102 and the second port 106, and which can be placed into a closed position in which the first and second ports 102, 106 are separated from one another in fluid-tight fashion. This allows tank 200 to be filled with filling material in the open position, and tank 200 to be transported with closing element 110 in the closed position, and thus with the valve apparatus in the closed position.

A first seal arrangement 120 and a second seal arrangement 130 are provided on closing element 110. These interact with a first seat 26 provided on the housing side and with a second such seat 136. Each of said seats 126, 136 may be designed as part of the housing 100 itself, or as an element which is inserted into housing 100 and connected thereto by a material fit, for example.

The first seal arrangement 120 faces the first port 102. In the open position of closing element 110, this means that a fluid passing through the first port 102 firstly comes into contact with the first seal arrangement 120, and then into contact with the second seal arrangement 130.

A constructionally simple and therefore cost-efficient design of seal arrangements 120, 130 is one that provides one or both seal arrangements with a first sealing ring 124 and a second sealing ring 134, which are disposed in receptacles 122 and 132 formed on closing element 110.

In the closed position of closing element 110, both seal arrangements 120, 130 are in sealing contact with the respectively assigned seat 126, 136. A chamber 140 is spatially delimited by seal arrangements 120, 130, closing element 110 and housing 100. Housing 100 may be embodied here also in multiple parts. For example, an annular component may be inserted and may delimit chamber 140 as a part of housing 100. Such a component can be advantageously connected in a material fit to housing 100 in order to prevent cavities in which germs can be trapped.

The valve apparatus has a reservoir 142 which can be connected to chamber 140 and which serves to accommodate a bactericidal fluid, such that chamber 140 can be filled, when closing element 110 is in the closed position, with the bactericidal fluid to form a germ barrier.

This reservoir 142 may be formed inside housing 100 of the valve apparatus, or inside a part which is flanged onto the housing. It may, alternatively, be a separate component which can be connected to chamber 140 via a fluid supply 148. The capacity is determined by the volume of chamber 140. It is advantageous if reservoir 142 remains on the valve apparatus and in contact with chamber 140 during transportation, so that bactericidal fluid can continue to flow into chamber 140. This ensures that the germ barrier is maintained over long periods of time, because even the slightest leakages in either of seal arrangements 120, 130 results in losses of bactericidal fluid that have to be offset. The connection between reservoir 142 and chamber 140 can be permanent, or can be controlled by means of a fluid valve 144. Fluid valve 144 provides additional advantages for variants of the method that will be described later.

Reservoir 142 and chamber 140 are adapted to form the germ barrier. For example, the volume of the chamber can be chosen so that a sufficient amount of bactericidal fluid is present in the chamber for reliable suppression of germs. The volume of the reservoir can be defined such that any fluid evaporating or leaking from the chamber is replenished from reservoir 142.

Reservoir 142 may be pressurised. Alternatively, or additionally, a means may be provided with which the fluid is placed under pressure.

Such a means may take the form of a weight that exerts pressure on the fluid. In this case, it is advantageous to provide fluid valve 144 and to use it to shut off the connection to the pressurised fluid. If reservoir 142 is pressurised, it can open into chamber 140 at any desired position. It is then advantageous to provide an outlet, preferably with a valve, at the highest point of chamber 140 in relation to the direction of gravity 10, via which gas can escape from the chamber and from the bactericidal fluid.

Within the arrangement, reservoir 142 can be advantageously disposed such that it opens into chamber 140 at the highest point thereof in relation to the direction of gravity 10. This makes it simpler to fill chamber 140 completely with bactericidal fluid to form a germ barrier. This also makes it particularly easy to keep the chamber-side pressure exerted on the first seal arrangement 120 lower than the tank-side pressure. It is also possible for air bubbles to escape from chamber 140 into reservoir 142.

To remove the germ barrier, a closeable outlet 180 may be provided that is advantageously placed at the lowest point of chamber 140, relative to the direction of gravity 10, and which can be closed by a suitable closure means 182.

Closing element 110 is connected to an adjustment device. The latter is designed to adjust closing element 110 between its open position and its closed position.

The adjustment device may be advantageously embodied in such a way that it additionally adjusts to a partial stroke position, the first seal arrangement 120 remaining in sealing contact with the first seat 126 when in the partial stroke position, while the second seal arrangement 130 does not come into contact with the second seat 136 assigned to it.

It is also advantageous in that case if the first seal arrangement 120, which is assigned to the first port 102, is embodied as a radial seal. By means of these design measures, the partial stroke position allows the fluid connection between the first and second ports 102, 106 to remain disconnected while chamber 140 is opened to the second port 106. In this way, it is possible for chamber 140 to be emptied, or for air bubbles to be removed from a liquid therein.

In the example shown, the adjustment device can be impinged upon by a pressure medium, and it is preferably designed to operate pneumatically. In order to allow the partial stroke, a secondary adjustment device 160 is provided in addition to a main adjustment device 150.

The main adjustment device 150, which moves closing element 110 between its open position and its closed position, comprises a main piston 152. When a main actuator volume 158 is filled with pressurised pneumatic fluid by means of a main pressure medium supply 154, main piston 152 is moved against a spring 156 that produces a restoring force. Main piston 152 is securely connected to a valve rod 170, which is connected, in turn, to closing element 110. The movement of main piston 152 is transferred by the fixed connections to closing element 110 and the latter is moved between its closed position and its open position.

A secondary piston 162 slides on valve rod 170. A secondary actuator volume 168 can be filled with pressurised pneumatic fluid by means of a secondary pressure medium supply 164. Secondary piston 162 is embodied in such a way that is comes firstly into contact with main piston 152 and displaces the latter until a part of secondary piston 162 touches a stop member 166 and movement is limited as a result. In this way, spring 156 produces the restoring force not only for the partial stroke but also for movement between the closed position and the open position. A plurality of springs may be provided in parallel and/or in series, in order to provide the desired restoring force.

The second seal arrangement 130 may advantageously be axial or semi-axial in configuration. A semi-axial configuration is shown in the example. The advantage is that a stop member is produced in this way, and that spring 156 exerts a defined closing force on closing element 110 and on the second seal arrangement 130. Should both seal arrangements 120, 130 be embodied as radial seals, a preferably metallic stop member has to be provided in the adjustment device, or even better in the region of closing element 110. The latter case avoids long tolerance chains that lead to undesired variation in the biasing force in a manufactured series of valve apparatuses, due to production-related variations in component dimensions.

The aseptic properties of the valve apparatus can be further enhanced by providing a bellows 172 that surrounds valve rod 170, the one end of the bellows being connected to closing element 110 and its other end being connected directly or indirectly to the adjustment device.

FIG. 2 shows the region of the closing element in cross-section.

Figure 2A:
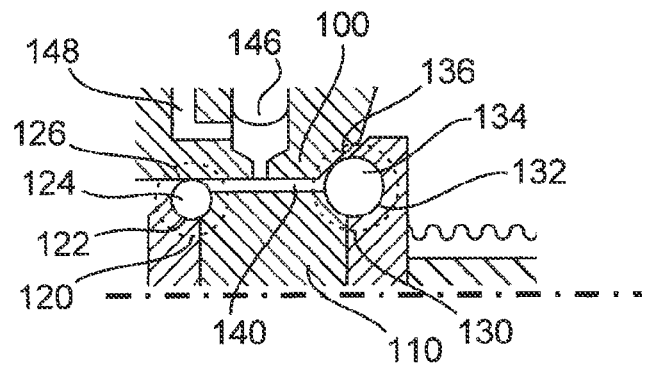
FIGS. 2a-2c: show enlarged cross-sections through the region of the closing element and the chamber of the valve apparatus according to FIG. 1. The individual Figures show the following.

Receptacles 122 and 132, in which sealing rings 124 and 134 are accommodated, are formed on the closing element. The respective receptacle 122, 132 and the respective sealing ring 124,134 together form one of seal arrangements 120, 130. The first seal arrangement 120 is embodied as a radial seal. In the closed position of closing element 110, chamber 140 is delimited by housing 100, closing element 110 and seal arrangements 20, 130. The closed position is shown in FIG. 2a. Both seal arrangements 120, 130 are in sealing contact with the respectively assigned seats 126, 136.

A fluid supply line 148 opens into chamber 140. A fluid valve closing element 146 is provided, which can be placed into a closed position in which the flow of fluid in fluid supply line 148 is interrupted. In this position, therefore, the supply of bactericidal fluid to chamber 140 is interrupted.

FIG. 2a shows the fluid valve closing element 146 in its open position and closing element 110 in its closed position. Chamber 140 is then connected to reservoir 142, and bactericidal fluid is present in chamber 140, thus forming a germ barrier.

Figure 2B:
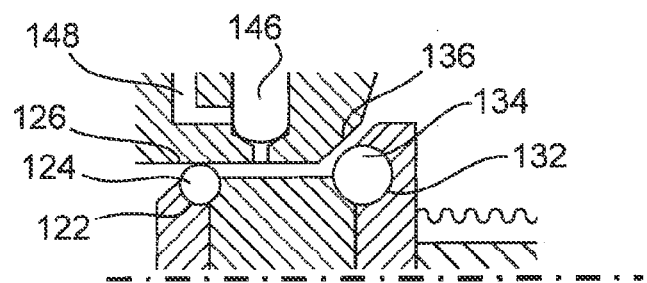

In FIG. 2b, closing element 110 is in the partial stroke position. Due to the first seal arrangement 120 being embodied as a radial seal, it is in sealing contact with the first seat 126, while a gap is formed between the second sealing ring 134 and the second seat 136 of the second seal arrangement 130. The fluid valve closing element 146 is in the closed position, so the bactericidal fluid flows out of chamber 140 when the arrangement is adjusted as shown.

Figure 2C:
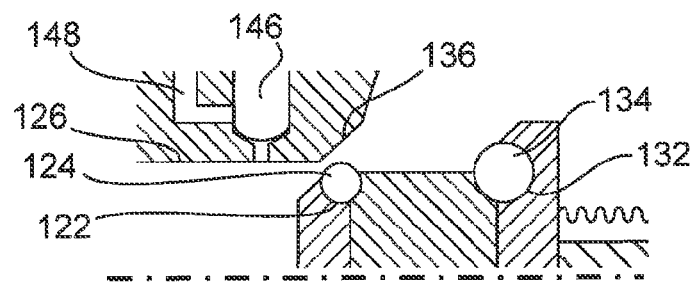

In FIG. 2c, closing element 110 is in the open position, and the fluid valve closing element 146 is in the closed position. This means that reservoir 142 is shut off, and no bactericidal fluid can flow into the interior of the valve apparatus, in which closing element 110 is located. In this position, tank 200 can be filled with filling material, or filling material can be removed from tank 200.

The method for operating the valve apparatus and the arrangement comprises the steps of filling tank 200 with filling material when the closing element is in the open position, then placing closing element 110 into the closed position, and then filling chamber 140 with bactericidal fluid.

In the example shown, these steps are performed in the manner described below.

The fluid valve closing element 146 is firstly placed into the closed position, thus shutting off reservoir 142. The main pressure medium supply 154 provides pressurised pneumatic fluid so that closing element 110 is placed into the open position. A fluid connection is now produced between the first and the second port 102,106, and filling material can be filled into tank 200.

Main adjustment device 150 is then vented, and closing element 110 is placed into the closed position by the force of spring 156. As a result, chamber 140 is completely enclosed by seal arrangements 120,130, closing element 110 and housing 100. By opening fluid valve closing element 146, chamber 140 is filled with bactericidal fluid.

In one development of the invention, closing element 110 is briefly placed into a partial stroke position, with the fluid valve closing element 146 remaining in the open position. This allows air bubbles to escape from the bactericidal fluid, without any of the fluid filling chamber 140 being lost.

In another development of the invention, the fluid valve closing element 146 is firstly closed, prior to removal of the filling material, thus shutting off reservoir 42 from chamber 140. Closing element 110 is then placed into the partial stroke position, so that the contents of chamber 140 flow out of same and can be removed through the second port 106. This occurs advantageously in a sterilisation process in which a space 108, which is located in the housing and through which valve rod 170 passes, is freed of germs.

In another development of the invention, closing element 110 is placed into the partial stroke position after the tank has been filled with filling material and before chamber 140 is filled with bactericidal fluid, and chamber 140 and space 108 are cleaned and sterilised while in that position.

The bactericidal fluid has a chemical composition that suppresses the formation of germs to such an extent that quality criteria are met and any limit values that apply are not exceeded after transportation.

The bactericidal fluid may contain at least 20% alcohol by volume. More particularly, it may be a fluid with an alcohol concentration of at least 20% by volume.

LIST OF REFERENCE SIGNS

10 Direction of gravity
100 Housing
102 First port
104 Valve flange
106 Second port
108 Space
110 Closing element
120 First seal arrangement
122 Receptacle
124 First sealing ring
126 First seat
130 Second seal arrangement
132 Receptacle
134 Second sealing ring
136 Second seat
140 Chamber
142 reservoir
144 Fluid valve
146 Fluid valve closing element
148 Fluid supply line
150 Main adjustment device
152 Main piston
154 Main pressure medium supply
156 Spring
158 Main actuator volume
160 Secondary adjustment device
162 Secondary piston
164 Secondary pressure medium supply
166 Stop member
168 Secondary actuator volume
170 Valve rod
172 Bellows
180 Outlet
182 Closure means
200 Container
202 Feed pipe
204 Tank-side flange
206 Interior of tank
208 Flange seal

The invention claimed is:

1. A valve apparatus having a housing (100), said housing comprising a first port (102) which can be connected to a transportable tank (200), and a second port (106), comprising a closing element (110) which is provided in the housing and which can be placed into an open position in which a fluid connection is produced between the first port and second port (102, 106), and which can be placed into a closed position in which the first and second ports (102, 106) are separated from one another in fluid-tight fashion, comprising a first (120) and a second (130) seal arrangement between said closing element and said housing, wherein the first and the second seal arrangement (120, 130) are spaced apart from one another and wherein each seal arrangement (120, 130) interacts with a corresponding seat (126, 136), a chamber (140) is provided which, in the closed position, is delimited by the seal arrangements (120, 130), the closing element (110) and the housing (100), characterised in that a reservoir (142) is provided which can be connected to the chamber and which can contain a bactericidal fluid, that the valve apparatus is transportable in closed position of the closing element (110), and that the chamber (140) and the reservoir (142) are adapted to form and maintain, for the entire duration of transportation, a germ barrier that is produced in the closed position by the bactericidal fluid contained in the chamber and in that the first seal arrangement (120) is assigned the first port (102) and is configured as a radial seal, and in that an adjustment device is provided and is designed such that it permits an adjustment of the closing element (110) between open position and closed position, and that it provides a part-stroke position, whereas in the part-stroke position the first seal arrangement (120) remains in sealing contact with the seat (126), while the second seal arrangement (130) does not touch the seat (136) assigned to it; and, in that the second seal arrangement (130) is implemented axial or semi-axial.

2. The valve apparatus according to claim 1, characterised in that the first and the second sealing arrangement (120, 130) each have a receptacle (122, 132) disposed on the closing element (110), and a sealing ring (124, 134) disposed in each respective receptacle.

3. The valve apparatus according to claim 1, characterised in that the first sealing arrangement (120) is assigned to the first port (102) and is embodied as a radial seal.

4. The valve apparatus according to claim 3, characterised in that an adjustment device is provided and configured to adjust the closing element (110) between the open position and the closed position and a partial stroke position, wherein the first seal arrangement (120) remains in sealing contact with the seat (126) in said partial stroke position, while the second seal arrangement (130) does not come into contact with the seat (136) assigned to it.

5. The valve apparatus according to claim 4, characterised in that a bellows (172) is provided, which surrounds a valve rod (170) connected to the adjustment device and the closing element (110).

6. The valve apparatus according to claim 4, characterised in that the adjustment device includes:
- a main adjustment device (150) which moves the closing element (110) between the open position and the closed position, and
- a secondary adjustment device (160) which places the closing element (110) into a partial stroke position.

7. The valve apparatus according to claim 6, characterised in that the main adjustment device (150) and the secondary adjustment device (160) are so designed that they can be impinged upon by a pressure medium.

8. The valve apparatus according to claim 1, characterised in that the second seal arrangement (130) has an axial or semi-axial configuration.

9. The valve apparatus according to claim 1, characterised in that a fluid valve (144) is disposed between the reservoir (142) and the chamber (140).

10. An arrangement comprising a tank (200) and a tank opening, characterised in that the tank opening is connected to the first port (102) of a valve apparatus according to claim 1.

11. The arrangement according to claim 10, characterised in that an aseptic screw-flange connection (104, 204) is provided between the tank opening and the first port (102).

12. The arrangement according to claim 10, characterised in that the tank is disposed (200) in a tank container.

13. The arrangement according to claim 10, characterised in that the reservoir (142) opens into the chamber (140) at the highest point thereof in relation to the direction of gravity (10).

* * * * *